United States Patent
Poskie et al.

(10) Patent No.: US 8,423,249 B2
(45) Date of Patent: Apr. 16, 2013

(54) TORQUE SENSOR SYSTEM WITH INTEGRATED ELECTRICAL CONNECTORS

(75) Inventors: Fredrick R. Poskie, Plymouth, MI (US); Carlos E. Marin, Oxford, MI (US); Daryl A. Wilton, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/300,712

(22) Filed: Nov. 21, 2011

(65) Prior Publication Data

US 2012/0191308 A1    Jul. 26, 2012

Related U.S. Application Data

(60) Provisional application No. 61/434,595, filed on Jan. 20, 2011.

(51) Int. Cl.
*F16H 37/06* (2006.01)

(52) U.S. Cl.
USPC ............ 701/51; 701/87; 73/781; 73/862.333; 73/862.335

(58) Field of Classification Search .................... 701/51, 701/87; 73/781, 862.333, 862.335
See application file for complete search history.

(56) References Cited

U.S. PATENT DOCUMENTS

| | | | |
|---|---|---|---|
| 425,324 A | 4/1890 | Howell | |
| 3,267,695 A | 8/1966 | Toelke | |
| 6,039,066 A | 3/2000 | Selby | |
| D454,942 S | 3/2002 | Selby | |
| 6,422,948 B1 | 7/2002 | Murakami | |
| 6,511,379 B2 | 1/2003 | Bondioli | |
| 6,648,007 B1 | 11/2003 | Selby et al. | |
| 6,726,571 B2 | 4/2004 | Ferriman et al. | |
| 6,758,105 B2 | 7/2004 | Viola et al. | |
| 6,817,253 B2 | 11/2004 | Gandrud | |
| 6,914,507 B2 | 7/2005 | Fujiu | |
| 7,138,895 B2 | 11/2006 | Chung | |
| 7,757,570 B1 | 7/2010 | Marin et al. | |
| 8,069,736 B2 | 12/2011 | Sakai | |
| 2003/0109346 A1* | 6/2003 | Horiuchi | .................. 475/60 |
| 2006/0225521 A1 | 10/2006 | Von Beck et al. | |
| 2010/0301984 A1 | 12/2010 | Wei et al. | |

FOREIGN PATENT DOCUMENTS

| | | |
|---|---|---|
| CN | 1820156 A | 8/2006 |
| DE | 19738349 A1 | 3/1998 |
| WO | WO2007006595 A1 | 1/2007 |

* cited by examiner

*Primary Examiner* — Mary Cheung
*Assistant Examiner* — Yuen Wong

(57) ABSTRACT

A torque sensor system for a transmission and other powertrain components in a motor vehicle includes a receiver and a transmitter. The receiver is operable to induce and detect a signal from the transmitter that is indicative of a torque load on the transmitter. The receiver is cylindrical and has an outer surface with a maximum, constant diameter. The outer surface defines one or more fluid transfer grooves and a docking port for an electrical connection. The fluid transfer groove and the docking port do not extend beyond the maximum outer diameter of the outer surface. Therefore, the receiver is capable of being press-fit within a component and is capable of routing fluid flow. An electrical connector is fed through an access hole and connects with the receiver.

16 Claims, 4 Drawing Sheets

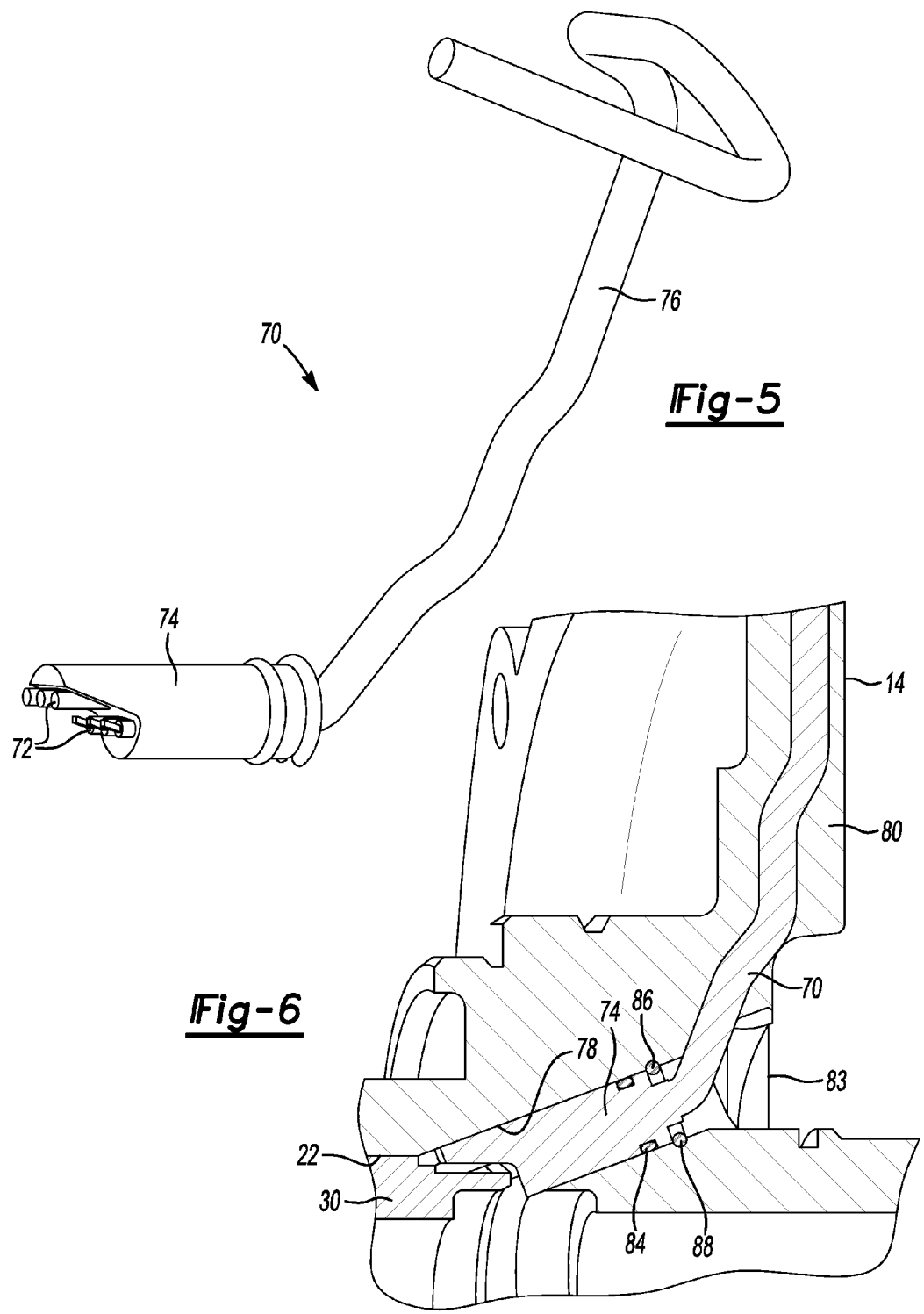

TORQUE SENSOR SYSTEM WITH INTEGRATED ELECTRICAL CONNECTORS

CROSS-REFERENCE

This application claims the benefit of U.S. Provisional Application No. 61/434,595, filed Jan. 20, 2011. The entire contents of the above application are incorporated herein by reference.

FIELD

The present disclosure relates to torque sensors, and more particularly to a torque sensor system having an electrical connector that connects with an integral contact pad on a torque sensor receiver.

BACKGROUND

The statements in this section merely provide background information related to the present disclosure and may or may not constitute prior art.

Transmissions and other powertrain components in automotive vehicles are complex mechanisms controlled by hydraulic systems and electronic control modules. In order to provide proper control, it is necessary to have feedback on the operating conditions and performance of the transmission as the transmission operates. For example, transmissions typically include a plurality of sensors that communicate information indicative of the operating state of the transmission to the electronic controller. These sensors take many forms and perform various functions. For example, it is often desirable to determine the torque on a rotating shaft (rotator) relative to a stationary component (stator). Accordingly, a torque sensor is used to measure the torque. Common torque sensors include strain gages, magnetic or optical sensors, and surface acoustic wave (SAW) sensors. These torque sensors each measure various parameters such as local strain, angular displacement, or strained-induced change on an acoustic wave. Typically these torque sensors have two components including what can generally be referred to as a transmitter and a receiver. The receiver is typically coupled to the stator and the transmitter is coupled to the rotator. In the case of magnetic sensors and SAW sensors, a current is induced through the receiver and torque applied on the rotator is transmitted back to the receiver in a form of current, radio signal or magnetic field which is then converted into an estimated torque.

However, transmission designs are becoming more compact in order to improve cost, mass, fuel economy, etc. To operate properly, the transmission usually requires supply of pressurized oil to lubricate, cool, or operate systems. One issue related to the above described torque sensors is the ability to package and assemble the torque sensor in current and future transmissions that have compact designs while not impeding pressurized oil flow or other necessary operations of the transmission.

While current transmission sensors are useful for their intended purpose, there is room in the art for an improved sensor system for a powertrain component that allows the torque sensor to be packaged in difficult areas of a transmission.

SUMMARY

A torque sensor system for a transmission and other powertrain components in a motor vehicle is provided. The torque sensor system includes a receiver and a transmitter. The receiver is operable to induce and detect a signal from the transmitter that is indicative of a torque load on the transmitter. The receiver is cylindrical and has an outer surface with a maximum, constant diameter. The outer surface defines one or more fluid transfer grooves and a docking port for an electrical connection. The fluid transfer groove and the docking port do not extend beyond the maximum outer diameter of the outer surface. Therefore, the receiver is capable of being press-fit within a component and is capable of routing fluid flow. An electrical connector is fed through an access hole and connects with the receiver.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 5 is a side perspective view of a connector; and

FIG. 6 is a cross section perspective view of a portion of an exemplary shaft assembly with the component and connector shown in FIGS. 4 and 5.

DETAILED DESCRIPTION

The following description is merely exemplary in nature and is not intended to limit the present disclosure, application, or uses.

Figure 1:
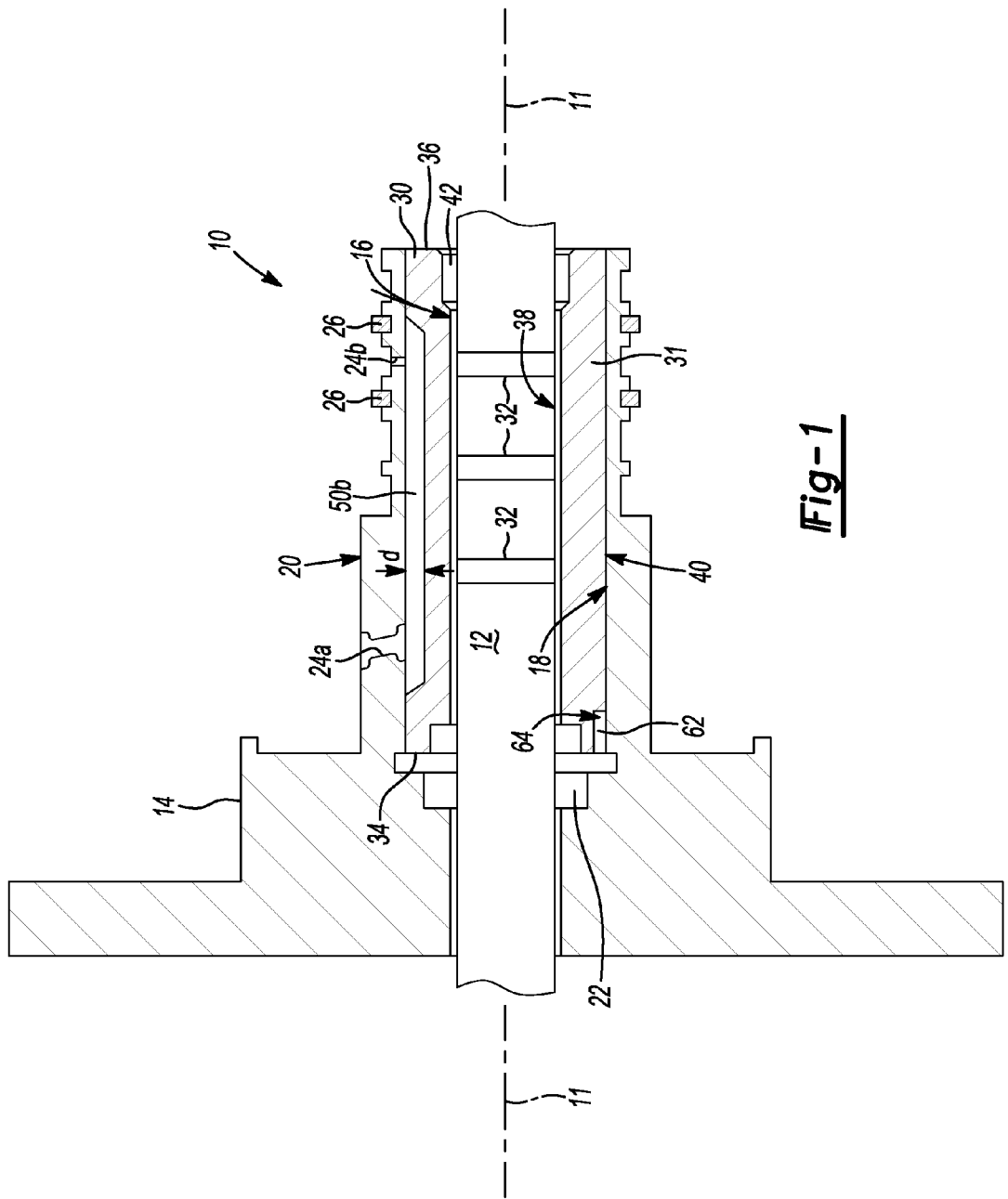
FIG. 1 is a cross section of a portion of an exemplary shaft assembly.

With reference to FIG. 1, an exemplary shaft or torque-transfer assembly is illustrated and indicated by reference number 10. In the example provided, the shaft assembly 10 may be part of a torque converter and transmission, however it should be appreciated that various other shafts or members may be employed in various parts of a vehicle powertrain without departing from the scope of the present invention. The shaft assembly 10 defines a linear axis 11.

As part of a torque converter and a transmission, the shaft assembly 10 includes a turbine shaft or rotating member 12, a stator or housing 14, and a torque sensor assembly 16. The turbine shaft 12 is coupled to the turbine (not shown) of a torque converter (not shown) and provides torque to the transmission (not shown). The turbine shaft 12 is rotatable about the axis 11. The housing 14 is rotationally fixed relative to the turbine shaft 12 and is preferably interconnected to a housing of the transmission (not shown). In alternate configurations, the housing 14 may be a rotating sleeve shaft and the turbine shaft 12 may be a rotationally fixed member. The housing 14 has an inner surface 18 and an outer surface 20. The inner surface 18 defines a bore or cavity 22 that is coaxial with the axis 11. The housing 14 includes, in the example provided, a first radially extending fluid passage 24A and a second radially extending fluid passage 24B that each communicate between the outer surface 20 of the housing 14 and the bore 22. The fluid passages 24A-B are preferably spaced along an axial length of the housing 14, though the locations of the fluid passages 24A-B on the outer surface 20 may vary without departing from the scope of the present invention. Additionally, the number of fluid passages 24A-B may vary without departing from the scope of the present invention. The fluid passages 24A-B are operable to receive one or more fluid flows of a pressurized hydraulic fluid, such as a transmission oil. A plurality of radial seals 26 are sealingly engaged to the outer surface 20 and to a sleeve (not shown) or other structure that supports the shaft assembly 10. The radial seals 26 are located axially on either side of the fluid passage 24B to hydraulically isolate the fluid passage 24B axially. The fluid passage 24A may also be sealed using radial seals (not shown) or other seal configurations without departing from the scope of the present invention. Finally, the outer surface 20 of the housing 14 may include various other features, such as gear teeth, apertures, shoulders, flanges, support members, grooves, etc., to engage, support, or interconnect with various other components of the transmission without departing from the scope of the present invention.

The rotating shaft 12 is disposed within the bore 22 and is concentric with the housing 14. The rotating shaft 12 is supported within the bore 22 by bearings (not shown) such that the rotating shaft 12 is operable to rotate about the axis 11 with respect to the housing 14. The rotating shaft 12 may be solid or have various fluid passages, bores, or other features not specifically shown.

As noted above, the rotating shaft 12 transfers torque between, for example, a turbine of a torque converter and a shaft, gear, clutch, or brake located within the transmission. The torque sensor assembly 16 is configured to sense the torque on the rotating shaft 12 at any given time. The torque sensor assembly 16 generally includes a receiver 30 and a transmitter 32. The torque sensor assembly 16 is, in the example provided, a magneto-elastic toque sensor that measures a magnetic flux. However, it should be appreciated that other types of torque sensor assemblies may be employed, such as a surface acoustic wave (SAW) sensor, a bulk acoustic wave (BAW) sensor, a surface acoustic wave filter, a surface acoustic wave resonator, a surface acoustic wave delay line, a bulk acoustic wave resonator, a strain gage, or an optical sensor.

Figure 2:
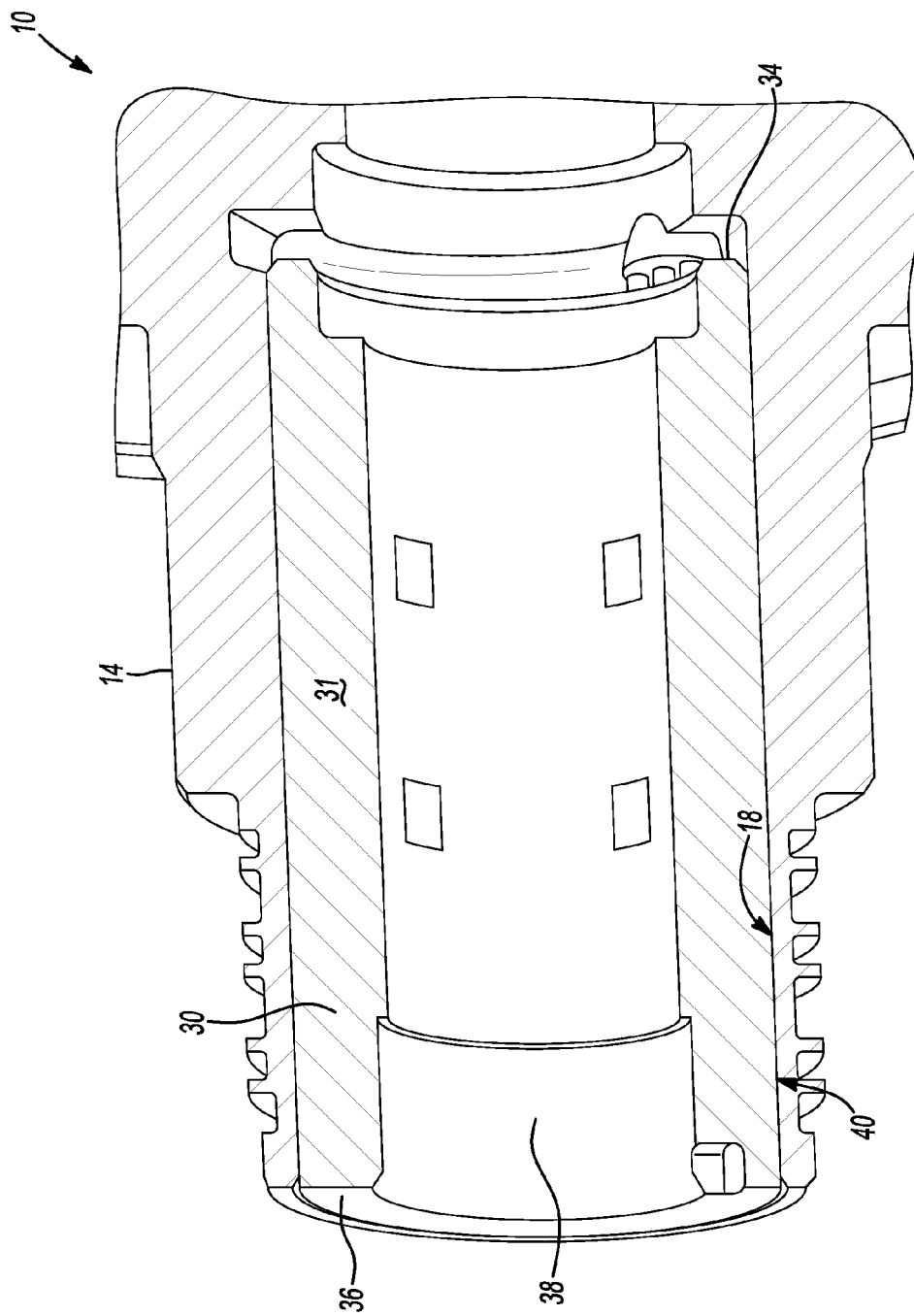
FIG. 2 is a cross section perspective view of a portion of an exemplary shaft assembly.
Figure 3:
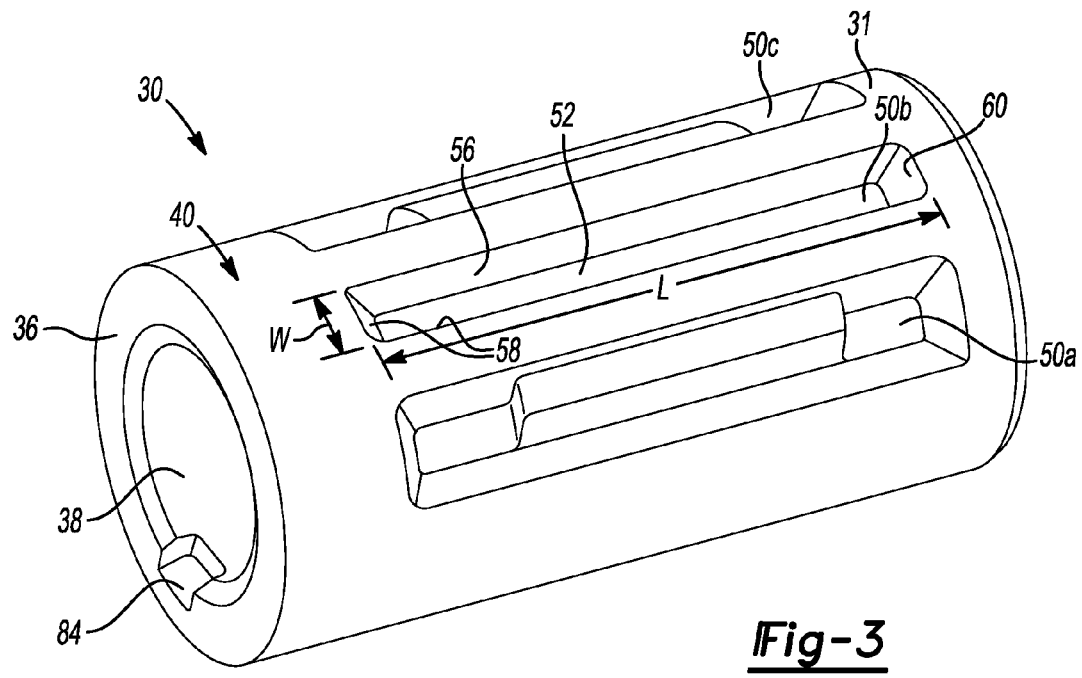
FIG. 3 is a perspective view of first side of a component of a torque sensor.

Turning to FIG. 3 and continued reference to FIGS. 1 and 2, the receiver 30 has a cylindrical or tubular body 31 and includes a first end 34, a second end 36 opposite the first end 34, an inner surface 38, and an outer surface 40. The tubular body 31 is a composite material, such as a plastic. The first and second ends 34 and 36 have openings that communicate with an inner bore 42 defined by the inner surface 38. The receiver 30 is press-fit within the bore 22 of the housing 14 such that the outer surface 40 of the receiver 30 is in press-fit contact with the inner surface 18 of the housing 14. The receiver 30 is coaxial with the axis 11. Accordingly, the shaft 12 extends through the inner bore 42 of the receiver 30.

The outer surface 40 of the receiver 30 defines a plurality of fluid grooves 50 including a first fluid groove 50A, a second fluid groove 50B, and a third fluid groove 50C. The fluid grooves 50A-C extend parallel to the axis 11. In the particular example provided, the receiver 30 includes three fluid grooves 50A-C sized and spaced to communicate with any number and location of fluid passages 24A and 24B located in the housing 14. It should be appreciated that any number of fluid grooves 50 may be included without departing from the scope of the present invention.

The fluid grooves 50A-C are each defined by a bottom surface 52, side surfaces 54 and 56, and end surfaces 58 and 60. Additionally, the fluid grooves 50A-C have a top surface defined by the inner surface 38 of the housing 14 when the receiver 30 is press-fit within the bore 22. The fluid grooves 50A-C extend into the receiver 30 to a predefined depth "d" and width "w" and have a predefined length "L". Accordingly, each of the fluid grooves 50A-C may have different depths and widths to accommodate various amounts of fluid flow and different lengths to accommodate the locations of fluid passages 24A-B, as will be described in further detail below. In the example provided the fluid grooves 50A-C are grouped together asymmetrically along the circumference of the receiver 30, though the fluid grooves 50A-C may be spaced equally circumferentially apart along the outer surface 40.

As noted above, the receiver 30 is sized to be press fitted within the bore 22 of the housing 14. More specifically, the receiver 30 is inserted within the bore 22 such that either the first end 34 or the second end 36 of the receiver 30 abuts an end or stepped portion of the bore 22. As the receiver 30 is pressed fitted in the bore 22, the transmitter 22 deflects which induces a compressive strain that seals the outer surface 40 of the receiver 30 to the inner surface 18 of the housing 14. The receiver 30 may be held in place by a snap ring (not shown), though various other methods of securing the receiver 30 within the housing 14 may be employed without departing from the scope of the present invention.

In the particular example provided, the fluid transfer tube 30 is aligned or oriented with the housing 14 such that the fluid groove 50B is aligned and communicates with fluid passages 26A and 26B. Accordingly, hydraulic fluid or oil is communicated between the fluid passage 24A and 24B via the fluid groove 50B. Therefore, the length "L" of any given fluid groove 50B is at least equal to the distance between any two fluid ports 24 that communicate with the given fluid groove 50A-C. It should be appreciated that the fluid flows may communicate in any direction through the fluid grooves 50A-C without departing from the scope of the present invention.

Figure 4:
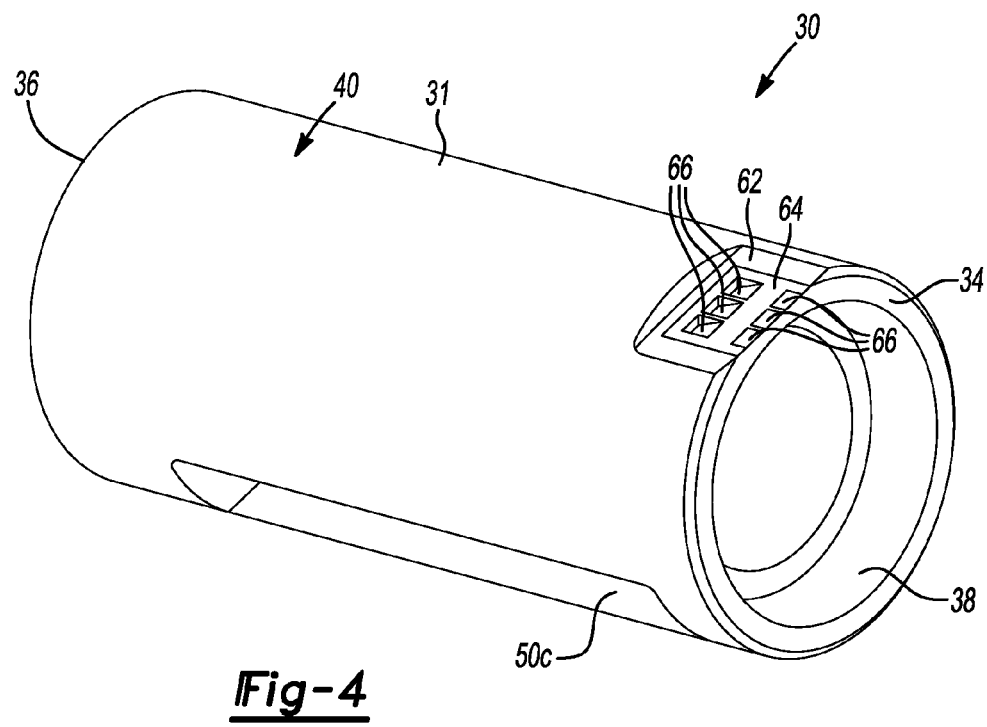
FIG. 4 is a perspective view of a second side of the component shown in FIG. 3.

Turning to FIG. 4, the receiver 30 further includes a docking port 62 located proximate the first end 34. The docking port 62 is a recess formed in the outer surface 40 and includes an electrical pad 64. The electrical pad 64 is substantially planar and includes a plurality of electrical connectors 66. The electrical connectors 66 communicate with the electronics package or torque measuring circuit (not shown) located within the body 31 of the receiver 30. The docking port 62 and the electrical connectors 66 do not extend beyond the outer diameter of the outer surface 40, thereby not interfering with the press-fit engagement between the receiver 30 and the housing 14.

Turning to FIG. 5, an electrical connector is indicated by reference number 70. The electrical connector 70 is selectively connectable to the docking port 62 in order to electrically link the receiver 30 to external controls such as a transmission control module or other control module (not shown) within the transmission. The electrical connector 70 is preferably a spring loaded (pogo-pin style) connector having multiple electrical connectors 72 at a distal end of a substantially cylindrical plug portion 74. An insulated wire or cable 76 extends from the plug portion 74 and communicates electrical signals from the receiver 30 through the multiple electrical connectors 72 to the external controls of the transmission or powertrain component. An exemplary electrical connector 70 is the Push Pogo Pin-1, made by Solarbotics. However, it should be appreciated that other electrical connectors may be employed.

With reference to FIG. 6, the electrical connector 70 is disposed within a bore 78 defined by the housing 14. The bore 78 communicates between an outer surface 80 of the housing 14 and the central bore 22 of the housing 14. In the example provided, the bore 78 has an axis 83 that intersects the axis 11 at an acute angle. The receiver 30 includes a feature, shown in FIG. 3, which contacts a feature (not shown) in the central bore 22 in order to radially orient the receiver 30 within the housing 14 such that the docking port 64 is aligned with the bore 78. As shown in FIG. 6, the bore 78 is sized to receive the plug portion 74 of the electrical connector 70.

During assembly, once the receiver 30 has been press fit within the housing 14, the electrical connector 70 is inserted into the bore 78 until the electrical connectors 72 mate or contact the electrical pad 64 of the receiver 30. A radial seal 84 seals the plug portion 74 to the bore 78 in order to prevent fluid leakage out of the housing 14. In addition, the plug portion 74 may be held in place by a retaining ring 86 that engages a groove 88 formed in the bore 78. The electrical connector 70 eliminates the need to feed wiring blindly through the bore 78 or any other access hole in the housing 14.

Returning to FIG. 1, the transmitter 32 includes one or more magnetoelastic rings secured to the shaft 12 and located within the receiver 30. A current is induced through the receiver 30 thereby magnetizing the magnetoelastic rings 32. Where there is no applied torque on the shaft 12, and therefore the magnetoelastic rings 32, the magnetic fields of the magnetoelastic rings are contained within the rings. As stress due to torque is applied to the shaft 12 and therefore the rings 32, the magnetic field twists and is detected by the receiver 30. The receiver 30 communicates the detected magnetic field values to the controller (not shown). Because the characteristics of the detected magnetic field are proportional to the applied torque on the shaft 12, the torque on the shaft 12 can be estimated.

The torque sensor assembly 16 allows the packaging of the receiver 30 in many previously impossible areas due to the ability of the receiver 30 to not impeded, but rather provide for, hydraulic oil flow through the transmission. In addition, by having a constant outer diameter, the receiver 30 can be easily and simply press-fit into a shaft assembly, thereby reducing assembly costs. Providing an electrical connector to allow blind assembly of a wiring harness to a deeply located multiple contact pad device connected to a torque neasuring circuit also reduces assembly costs and complexity.

The description of the invention is merely exemplary in nature and variations that do not depart from the gist of the invention are intended to be within the scope of the invention. Such variations are not to be regarded as a departure from the spirit and scope of the invention.

The following is claimed:

1. An apparatus for measuring torque on a shaft relative to a member and for communicating the measured torque to a controller, the apparatus comprising:
    a receiver coupled to the member, the receiver having a sensing circuit and an outer surface, the outer surface having a docking port with a first electrical connector disposed in the docking port and in electronic communication with the sensing circuit, wherein the docking port is recessed within the outer surface;
    a transmitter coupled to the shaft; and
    a connector interfaced with the docking port and having a wire in electric communication with a second electrical connector, wherein the second electrical connector is in electric communication with the first electric connector and the wire is in electric communication with the controller, and
    wherein a current is supplied by the controller through the connector to the sensing circuit of the receiver thereby magnetizing the transmitter, and wherein as stress due to torque is applied to the shaft and therefore the transmitter the sensing circuit of the receiver detects a magnetic field and communicates a magnitude of the magnetic field through the connector to the controller to estimate the torque on the shaft.

2. The apparatus of claim 1 wherein the docking port and the at least one electric connector do not extend beyond an outermost diameter of the receiver.

3. The apparatus of claim 1 wherein the connector is a spring loaded connector.

4. The apparatus of claim 1 wherein the connector includes a plug portion having the second electrical connector disposed at a distal end of the plug portion, and wherein the plug portion is configured to interface with the docking portion of the receiver.

5. The apparatus of claim 1 wherein the transmitter includes at least one magnetoelastic ring.

6. The apparatus of claim 1 wherein the receiver is cylindrical and includes a first open end and a second open end opposite the first open end, and wherein the docking port is located on the outer surface at one of the first open end and the second open end.

7. The apparatus of claim 1 further comprising a ring seal disposed around the connector for sealing the connector to the member.

8. An assembly for measuring torque in a motor vehicle, the assembly comprising:
    a controller;
    a first member having an inner surface that defines a bore;
    a receiver located within the bore and having an outer surface sealingly engaged with the inner surface of the first member, wherein the receiver includes an sensing circuit and the outer surface includes a docking port with a first electrical connector disposed in the docking port and in electronic communication with the sensing circuit, wherein the docking port is recessed within the outer surface;
    a second member disposed through the receiver;
    a transmitter coupled to the second member; and
    a connector disposed into the bore through the first member, wherein the connector is interfaced with the docking port and includes a wire in electric communication with a second electrical connector, and wherein the second electrical connector is in electric communication with the first electric connector and the wire is in electric communication with the controller, and
    wherein a current is supplied by the controller through the connector to the sensing circuit of the receiver thereby magnetizing the transmitter, and wherein as stress due to torque is applied to the second member and therefore the transmitter the sensing circuit of the receiver detects a magnetic field from the transmitter and communicates a magnitude of the magnetic field through the connector to the controller to estimate the torque on the second member.

9. The assembly of claim 8 wherein the first member is a transmission housing and the second member is a shaft.

10. The assembly of claim 8 wherein the receiver is cylindrical and includes a first open end and a second open end opposite the first open end, and wherein the second member is disposed through the receiver.

11. The assembly of claim 10 wherein the docking port is located on the outer surface at one of the first open end and the second open end.

12. The assembly of claim 8 wherein the docking port and the at least one electric connector do not extend beyond an outermost diameter of the receiver.

13. The apparatus of claim 8 wherein the connector is a spring loaded connector.

14. The apparatus of claim 8 wherein the connector includes a plug portion having the second electrical connector disposed at a distal end of the plug portion, and wherein the plug portion is configured to interface with the docking portion of the receiver.

15. The apparatus of claim 8 wherein the transmitter includes at least one magnetoelastic ring.

16. The apparatus of claim 8 further comprising a ring seal disposed around the connector for sealing the connector to the first member.

\* \* \* \* \*